United States Patent
Campbell et al.

[19]

[11] Patent Number: 6,040,917
[45] Date of Patent: Mar. 21, 2000

[54] MEMORY PARTITIONING FOR MULTI-RESOLUTION PAUSELESS PAGE PRINTING

[75] Inventors: Russell Campbell; Richard M. Dow; Timothy P. Blair; Burton H. Poppenga, all of Boise, Id.

[73] Assignee: Hewlett-Packard Company, Palo Alto, Calif.

[21] Appl. No.: 08/958,437

[22] Filed: Oct. 27, 1997

[51] Int. Cl.[7] .................................................. G06K 15/00
[52] U.S. Cl. ........................................... 358/1.17; 358/1.2
[58] Field of Search ...................... 395/101, 110, 395/111, 113, 114, 115, 116, 872, 876; 358/404, 444, 449, 467, 1.1, 1.2, 1.11, 1.12, 1.14, 1.13, 1.15, 1.16, 1.17; 400/76; 382/232; 710/52, 56

[56] References Cited

U.S. PATENT DOCUMENTS

| | | | |
|---|---|---|---|
| 5,159,681 | 10/1992 | Beck et al. | 395/16 |
| 5,479,587 | 12/1995 | Campbell et al. | 395/116 |
| 5,483,622 | 1/1996 | Zimmerman et al. | 395/114 |
| 5,522,017 | 5/1996 | Ueda | 395/15 |
| 5,825,993 | 10/1998 | Shimura et al. | 395/115 |

OTHER PUBLICATIONS

Patent Application (PD) 10971109–1; (Title) Reducing Memory Fragmentation By Coalescing And Redistributing Previously Distributed Page Strips; (Inventor) Timothy P. Blair; (Filed) Aug. 26, 1997; (Pgs.) 15; (Drwgs.) 4; (Tot Clms.) 20; (Ind. Clms.)4:.

*Primary Examiner*—Arthur G. Evans
*Attorney, Agent, or Firm*—Lane R. Simmons

[57] ABSTRACT

A multi-resolution capable printer includes a critical operations memory buffer for enabling critical page print operations to occur without flushing the video buffers and without waiting for returned-in memory to heal into larger free blocks. The critical operations buffer thus enables improved constant printer throughput and reduced "pausing" during a multi-page print job. The critical operations buffer is dynamically sized to the resolution of the current page being printed. Thus, at higher resolution configurations, the critical operations buffer is reduced in size to allow the video buffers to increase in size to accommodate the higher resolution. At lower resolution configurations, the critical operations buffer is increased in size and the video buffers are decreased in size to accommodate the lower resolution. Advantageously, the total combined pre-reserved memory area utilized by the critical operations buffer and the video buffers remains constant. The critical operations buffer is utilized for large contiguous memory allocation requests, pre-rasterization operations, compressing operations, rendering character bitmaps, scaling and rotating raster objects, building vector paths, defragmenting the memory, and the like.

20 Claims, 6 Drawing Sheets

MEMORY PARTITIONING FOR MULTI-RESOLUTION PAUSELESS PAGE PRINTING

FIELD OF THE INVENTION

This invention relates in general to image forming devices and, more particularly, to page printer memory management.

BACKGROUND OF THE INVENTION

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" occurs and the page is not printable.

Several methods have been used in the prior art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then logically divided into sections called page strips, which page strips are then individually rendered (i.e., the described objects in the page strips are rendered) into a raster bit map and passed to the print engine for printing. This procedure enables lesser amounts of RAM to be used for the print image.

When the display commands are rendered at a fast enough pace, the same memory used to store a first page strip can be reused for a subsequent page strip further down the page. For example, in certain prior art printers it is known to employ three raster buffers for storing page strips. During page processing, the first buffer is reused for a fourth strip on the page, the second is reused for a fifth strip, etc. However, under standard (generally maximum) page-per-minute performance, little time is left between finishing printing of a strip and when a next strip is required to be rasterized from the same print buffer.

Under certain circumstances, "complex" page strips will include many display commands and require a longer than normal time for rasterization. Additionally, to rasterize a page strip (whether "complex" or not), more memory space may be required than is currently available—depending upon several factors associated with the printer, including memory size, memory fragmentation, job to be printed, and other printer system activities. In the case of a complex strip, rasterization time may increase to such an extent that the succeeding strip can not be delivered on time, thus causing a print overrun to occur.

In the event of low available memory for processing print commands, each page strip of a page may be reevaluated and passed through several steps in attempt to reduce memory allocation requirements and free up more memory. For example, each page strip may be rasterized and compressed using one of several compression techniques. U.S. Pat. No. 5,479,587 (Campbell et al.) describes a Page Printer Having Adaptive Data Compression for Memory Minimization and is incorporated herein by reference in full. In Campbell et al, after a page strip is rasterized and compressed, the memory allocation requirement for that strip is determined. If the memory allocation requirement is less than the memory allocation requirement of the display list for that same strip (relative to a predetermined comparison threshold), then the rasterized and compressed version will be used and stored in memory rather than the display list. On the other hand, if the rasterized and compressed strip's memory allocation requirement is not less than the memory allocation requirement for its display list (per the threshold), then the strip may be processed again using a different compression technique. These steps of rasterizing a strip, compressing it, comparing the size of the compressed version to the display list, and determining if the memory allocation requirement of the compressed version is less than that of the display list, may be repeated multiple times using differing compression techniques and/or thresholds until the strip's allocation requirement is less than that of its display list.

When it is determined that the threshold has been met (i.e., the rasterized and compressed page strip memory allocation requirement is less than that of the display list), then the strip's display list is deallocated from memory and the rasterized and compressed page strip is stored to memory. The page strip is stored in memory by being dissected into fragments (segments) and then linked and distributed into "holes" in the memory. The "holes" are, typically, smaller isolated free areas of memory surrounded by larger unavailable (used) areas.

Once all of the page strips have been rasterized, compressed, evaluated and distributed (when the threshold was met) then processing of the print commands resumes at the point where the event of low available memory was previously detected (i.e., the point that initiated the reevaluation process for the page). The page strip that was previously attempting a memory allocation (but detected the low available memory event) should now have a better chance of being able to satisfy its memory allocation.

Distinguishing now from Campbell et al., U.S. Pat. No. 5,483,622 (Zimmerman et al.) discloses a Page Printer Having Automatic Font Compression and is also incorporated herein by reference in full. In Zimmerman et al., in the event of low available memory for processing print commands, alternative steps occur to alleviate the low memory error including: (i) compressing raster graphic images, and (ii) if no raster graphic images are present or if compression of the raster graphic images does not remove the low memory error, then compressing font characters. Additionally, a large size font whose size exceeds a threshold may automatically be compressed, regardless of a memory low/out signal being present.

Although these memory processing techniques often enable a memory allocation request to be satisfied, fragmentation of the memory may not be reduced. For example, fragmentation may not be reduced during page strip processing because each strip is processed independently of all other strips. Namely, if a first strip is rasterized, distributed and stored, and then some memory surrounding a distributed segment of that first strip is subsequently deallocated, then the first strip ends up actually causing fragmentation in the memory since it remains there even after its surrounding areas were deallocated. This scenario may occur, for example, if a segment of the first strip was stored in a hole that was created by a second strip's display list, and then the second strip's display list was removed from around the first strip in order to render the second strip's rasterized and compressed page strip. Disadvantageously, if the memory becomes too fragmented (i.e., too many "holes" exist throughout the memory address space) such that other memory allocation requests cannot be satisfied that require contiguous allocations of memory, then overall page processing is crippled and a memory out error may result. U.S. patent application Ser. No. 08/918,835 further describes the dissecting of page strips into holes in memory and further describes a method of reducing fragmentation and is incorporated herein by reference in full.

Due to memory fragmentation and the general contention for memory in a printer for processing print commands, in some cases the printing process has been known to undesirably "pause" when processing certain multi-page print jobs. When a pause occurs, it has been recognized that the printer is waiting for the allocation in memory of a "monster" band (i.e., a large page strip) that is required for print overrun avoidance. Often, however, after the current pages that are in the print pipeline are printed, sufficient memory becomes available so that the "monster" allocation may generally be satisfied and, thus, conclude the "pause".

However, this potential "pausing" during a multi-page print job is not only undesirably but also frustrating to a user that expects a certain page-per-minute output as described by the page printer's specifications. Accordingly, an object of the present invention is to improve consistency of page throughput in a printer by reducing pausing during multi-page print jobs.

SUMMARY OF THE INVENTION

According to principles of the present invention in a preferred embodiment, a multi-resolution capable printer includes a critical operations memory buffer for enabling critical page print operations to occur without flushing the video buffers and without waiting for returned-in memory to heal into larger free blocks. The critical operations buffer thus enables improved constant printer throughput and reduced "pausing" during a multi-page print job.

According to further principles, the critical operations buffer is dynamically sized to the resolution of the current page being printed. Thus, at higher resolution configurations, the critical operations buffer is reduced in size to allow the video buffers to increase in size to accommodate the higher resolution. At lower resolution configurations, the critical operations buffer is increased in size and the video buffers are decreased in size to accommodate the lower resolution. Advantageously, the total combined pre-reserved memory area utilized by the critical operations buffer and the video buffers remains constant.

The critical operations buffer is utilized for large contiguous memory allocation requests, pre-rasterization operations, rendering character bitmaps, compressing data, scaling and rotating raster objects, building vector paths, and the like.

Other objects, advantages, and capabilities of the present invention will become more apparent as the description proceeds.

DETAILED DESCRIPTION OF THE INVENTION

Figure 1:
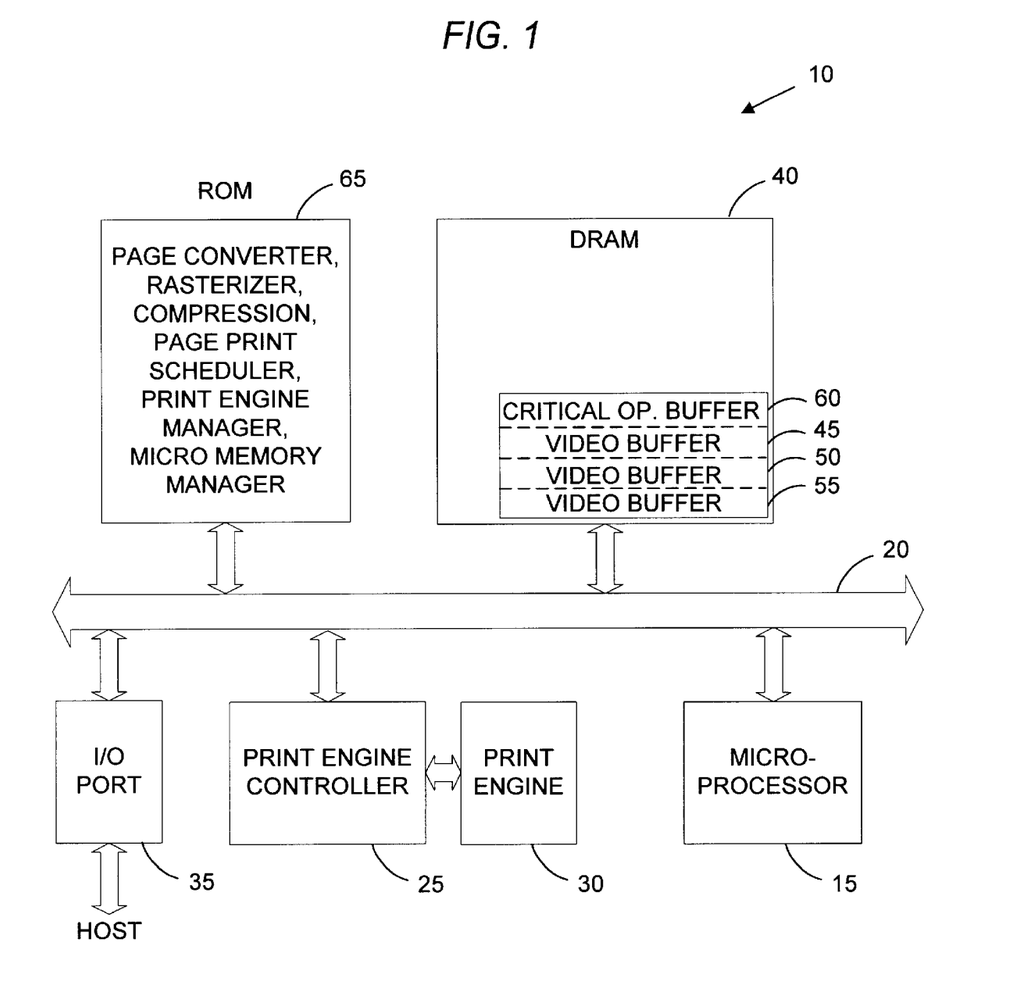
FIG. 1 is a block diagram of a printer embodying the present invention system and method for reducing pausing in a multi-page print job.

FIG. 1 is a high level block diagram of a page printer 10 incorporating the present invention system and method for reducing printer pauses during a multi-page print job. Page printer 10 is controlled by a microprocessor 15 which communicates with other elements of the system via bus 20. A print engine controller 25 and associated print engine 30 connect to bus 20 and provide the print output capability for the page printer. In a preferred embodiment, print engine 30 is a multi-resolution capable engine. For example, it can print, selectively, at 600 or 1200 dot per inch (dpi). Print engine 30 is also preferably a laser printer that employs an electrophotographic drum imaging system, as well known in the art. However, as will be obvious to those of ordinary skill in the art, the present invention is similarly applicable to other types of printers and/or imaging devices for improving consistency of page throughput.

An input/output (I/O) port 35 provides communications between the page printer and a host computer (not shown) and receives page descriptions from the host for processing within the page printer. A dynamic random access memory (DRAM) 40 provides a main memory for the page printer. A first portion of DRAM 40 includes three (in this example) pre-allocated (reserved) buffers 45, 50 and 55 (hereinafter 45–55) which are employed during page strip processing. These buffers may be video buffers (in a preferred embodiment) or some other pre-allocated buffers. During the print process, each pre-allocated video buffer receives a selected page strip's rasterized image data for storing and passing the same to print engine controller 25 and print engine 30. Only after one of the buffers 45, 50 or 55 becomes available (i.e., the page strip's rasterized data is transferred/imaged onto the drum), can a next page strip of rasterized data be inserted. During a multi-page (pipelined) print job, these video buffers are constantly in use and are used only for temporarily storing the rasterized image data prior to being output to the print engine. Although the pipeline of print data may be "flushed" out of the video buffers to free them up for other print processing needs, it is not generally desirable to do so because of the inevitable "pausing" that occurs in the printing process (whether in the middle of a current multi-page print job, or in between print jobs). In this context, "flushing" generally means waiting for sufficient memory 40 to be freed up to satisfy a particular allocation request, which may mean waiting for pages that are currently being processed to actually be printed.

A second portion of DRAM 40 includes another pre-allocated (reserved) buffer 60. Buffer 60 is a critical operations buffer and is used only for storing critical operation data for the express purpose of reducing printing pauses by the print engine which would potentially otherwise occur due to fragmentation of general memory area 40 and the general contention for memory therein during processing of print commands. Although buffer 60 is shown as a block of addressable area that is immediately adjacent video buffers 45–55, this example is for ease of description purposes only. As such, it will be obvious to those of ordinary skill in the art that buffer 60 may be, alternatively, an addressable area that is completely separate from video buffers 45–55 in another area of DRAM 40, or in a completely physically separate memory device.

Preferably, critical operations buffer 60 is used to store data that requires a contiguous allocation of memory. For example, data stored in critical operations buffer 60 may include, selectively, pre-rasterized data, compressed data, pre-rasterized and compressed data, rendered character bitmaps, scaled raster objects, rotated raster objects, vector path data, or other data used for defragmenting memory 40. Additionally, the data is stored in buffer 60 only temporarily relative to page strip data stored and processed in general memory 40. Namely, it is temporary because the buffer is released for further use after completion of the critical operation (i.e., pre-rasterization, compression, etc.), but at least upon the close of a page being printed.

Advantageously, buffer 60 provides a reserved, contiguous area of memory for certain critical operations during page processing without, generally, having to wait for memory to be freed up in general memory 40 and without having to flush out video buffers 45–55 (i.e., without waiting for them to be flushed). The sizing and dynamic aspects of buffers 45–55 and 60 will be discussed more fully further herein.

A read only memory (ROM) 65 holds firmware which controls the operation of microprocessor 15 and page printer 10. The code procedures stored in ROM 65 may include the following: a page converter, rasterizer, compression code, page print scheduler and print engine manager. ROM 65 further includes a micro memory manager according to the present invention. The page converter firmware converts a page description received from the host to a display command list. As discussed, each display command defines an object to be printed on the page. The rasterizer firmware converts each display command to an appropriate bit map (rasterized strip) and distributes the bit map into memory 40. The compression firmware compresses the rasterized strips in the event insufficient memory exists in memory 40 for holding the rasterized strips. The micro memory manager dynamically adjusts the sizes of buffers 45–55 and 60, and controls the use of those buffers, especially buffer 60 relative to critical operations, according to the present invention as will be described more fully herein.

When a page is closed for processing (i.e., all strips have been evaluated, rasterized, compressed, etc. for processing by print engine 30) then the rasterized strips are stored in one of the pre-allocated buffers 45–55 and subsequently passed to print engine 30 by print engine controller 25, thereby enabling the generation of an image (i.e., text/graphics etc). The page print scheduler controls the sequencing and transferring of page strip buffers to print engine controller 25. The print engine manager controls the operation of print engine controller 25 and, in turn, print engine 30.

The operation of page printer 10 commences when it receives a page description from a host computer via I/O port 35. The page description is placed in DRAM 40. Microprocessor 30 accesses the page description, line by line, and builds a display command list using the page converter firmware in ROM 65. As discussed, the display command list is a set of commands that describe what must be printed and forms an intermediate description of the page. As the display command list is being produced, the display commands are sorted by location on the page and allocated to page strips in memory 40.

In the event of low available memory 40 for processing the display commands and allocation of the same to a page strip, each strip for (which an allocation of memory is not satisfied) is rasterized and compressed (by the firmware in ROM 65) in order to reduce the memory allocation requirement from memory 40 as much as possible. This may occur, for example, if a large amount of memory is required or if a contiguous amount of memory is required that is not allocable in memory 40. If the rasterized and compressed strip consumes less memory than the original display list, then the rasterized and compressed strip is dissected into linked fragments and distributed into holes in memory 40. Each page strip is subsequently converted to and stored as a rasterized bit map in one of the buffers 45–55 for final output to print engine 30.

Importantly, the micro memory manager firmware in ROM 65 manages critical operations that would, otherwise, potentially result in an insufficient memory allocation from memory 40. Specifically, if a critical operation is detected during processing of the display lists, then the operation is performed using buffer 60. A critical operation may be any operation that might not be satisfied by a memory allocation request from memory 40. For example, again, critical operations may be any allocation requirement of a contiguous chunk of memory, pre-rasterization of a page strip, rendering of character bitmaps, data compression, scaling and/or rotating of raster objects, building of vector paths, or defragmenting of memory 40. In each case, upon detection of the critical operation, memory is allocated from buffer 60, the data is stored into buffer 60, the operation is performed, and then the buffer is deallocated. Thus, buffer 60 is used for a critical operation and then immediately freed up for another critical operation use to enable an enhanced, more generally continuous and pauseless printing process.

Figure 2A:
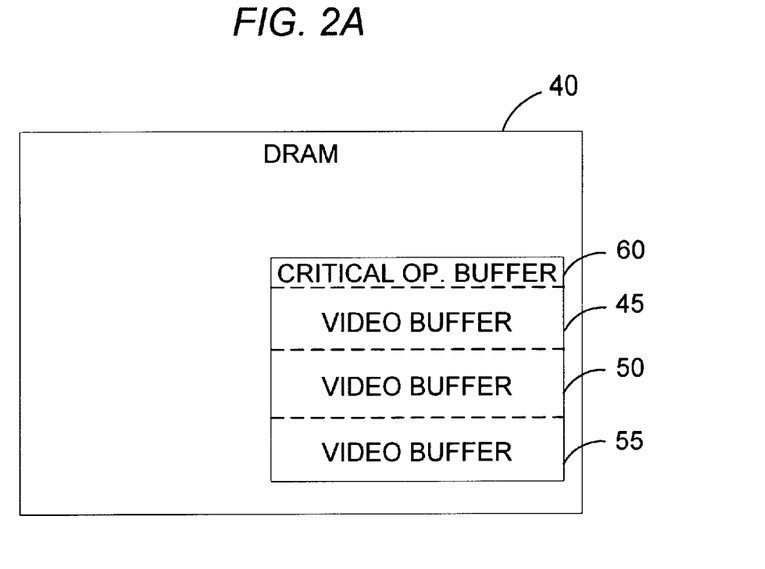
FIGS. 2A–B are block diagrams of a DRAM memory depicting the dynamic configuration aspects of the video buffers and critical operations buffer of the present invention.
Figure 2B:
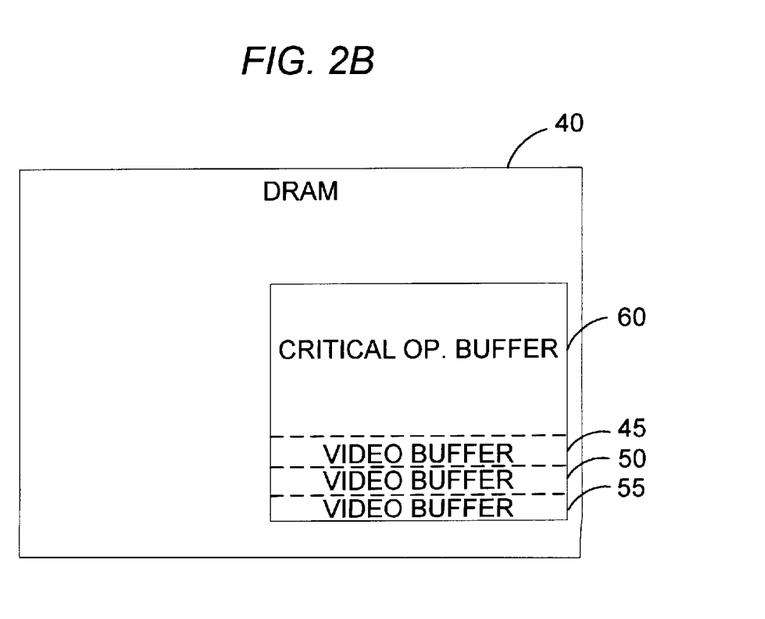

Referring now to FIGS. 2A and 2B, DRAM 40 is depicted in block format to show the dynamic configuration aspects of video buffers 45–55 and critical operations buffer 60 as managed by the micro memory manager firmware in ROM 65. FIG. 2A depicts the buffer configurations for a 1200 dpi page job, and FIG. 2B depicts the buffer configurations for a 600 dpi page job. Although 1200 and 600 dpi page jobs are shown in these examples, it will be obvious that these are merely exemplary and that other dpi configurations are equally applicable. What is important, however, under principles of the present invention, is that video buffers 45–55 increase in size, and that critical operations buffer 60 decreases in size, to dynamically accommodate a higher resolution configuration page job (FIG. 2A), and that video buffers 45–55 decrease in size and the critical operations buffer 60 increases in size to dynamically accommodate a lower resolution configuration (FIG. 2B) page job.

For example, in a preferred embodiment, in the 1200 dpi configuration of FIG. 2A, each video buffer 45–55 is about 200K bytes (sufficient to accommodate a full page strip at that dpi), and the critical operations buffer 60 is only about 20K bytes. In this context, these reserved buffers 45–55 and 60 use a combined total of about 620K bytes from the general pool of memory 40 which may be, for example, about 4M bytes. Obviously, however, each of these numbers are merely exemplary and may be easily modified per total available memory and other design requirements and preferences. Similarly, page strip sizes may vary and, thus, video buffer sizes would be adjusted accordingly.

On the other hand, in the 600 dpi configuration of FIG. 2B, video buffers 45–55 are dynamically reduced in size (relative to FIG. 2A) to accommodate the smaller page strip size that accompanies a 600 dpi job. If it is assumed that each page strip requires 75K bytes in a 600 dpi context, then each video buffer 45–55 is adjusted to allocate 75K bytes. But, critical operations buffer 60 is increased in size to about 395K bytes to consume the difference by which the video buffers were reduced (relative to the 1200 dpi size configuration). In essence, the total combined reserved buffer space allocated between video buffers 45–55 and critical operations buffer 60 remains constant (as a total reserved area of about 620K bytes in this example), but the logical sizing of the buffers dynamically adjusts within that total reserved area to fit the current page dpi. This increased sizing for critical operations buffer 60 for the lower resolution page job significantly improves the pauseless printing aspects of printer 10.

Figure 3:
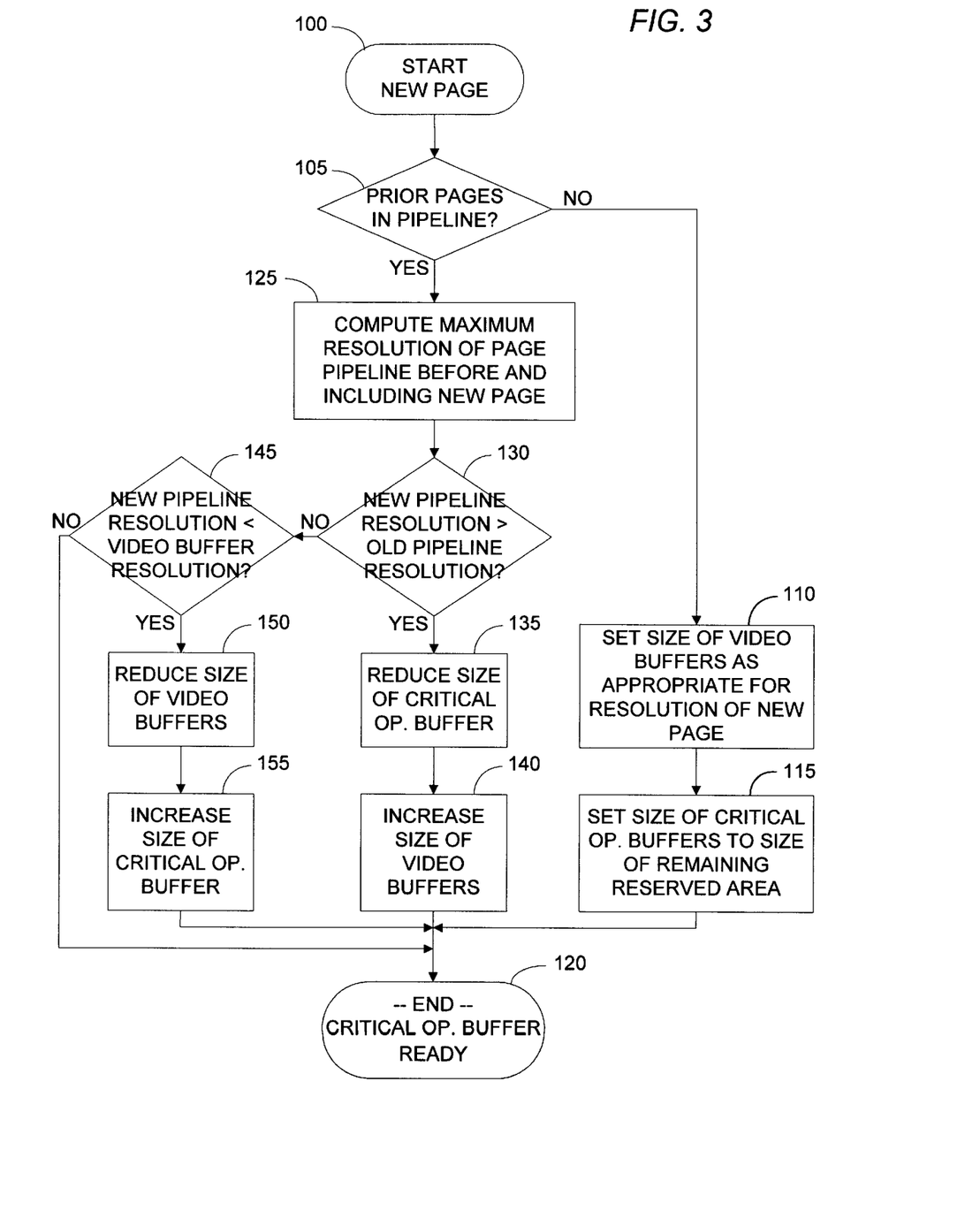
FIG. 3 is a flow chart depicting a preferred method of the present invention for dynamically sizing video buffers and a critical operations buffer.

Turning now to FIG. 3, a flow chart diagrams a preferred method of the present invention for dynamically sizing video buffers 45–55 and critical operations buffer 60. Upon the start of a new page 100, if there are no prior pages in the print pipeline 105 (i.e., no pages are already being processed by printer 10), then the size of video buffers 45–55 are set as appropriate 110 for the resolution of the new page (i.e., each video buffer size equals the size of a page strip for the resolution of the new page). Additionally, the critical operations buffer 60 is set to the size 115 of the remaining total reserved area (the total combined reserved area for all buffers 45–55 and 60). Thus, the critical operations buffer is ready 120 for page processing relative to the current (new page) resolution.

In the event there are prior pages in the pipeline 105, then a new maximum resolution of the page pipeline is computed 125. The maximum resolution of the pipeline is determined from those pages already in the pipeline before the new page, and including the new page. Subsequently, 130, if the new maximum resolution computed is greater than the old pipeline resolution, then the size of the critical operations buffer is reduced 135 and the size of the video buffers is increased to accommodate the new higher resolution in the pipeline.

If the new maximum pipeline resolution is not greater than the old pipeline resolution 130, and if the new maximum pipeline resolution is less than the current resolution of the video buffers 145 (i.e., the resolution of the video buffers being indicative of their size as per pre-allocated design parameters), then the video buffers are reduced in size 150 and the critical operations buffer is increased in size 155. This increase in critical operations buffer size allows the new lower resolution page to be processed with reduced potential for pausing by the printer.

Figure 4A:
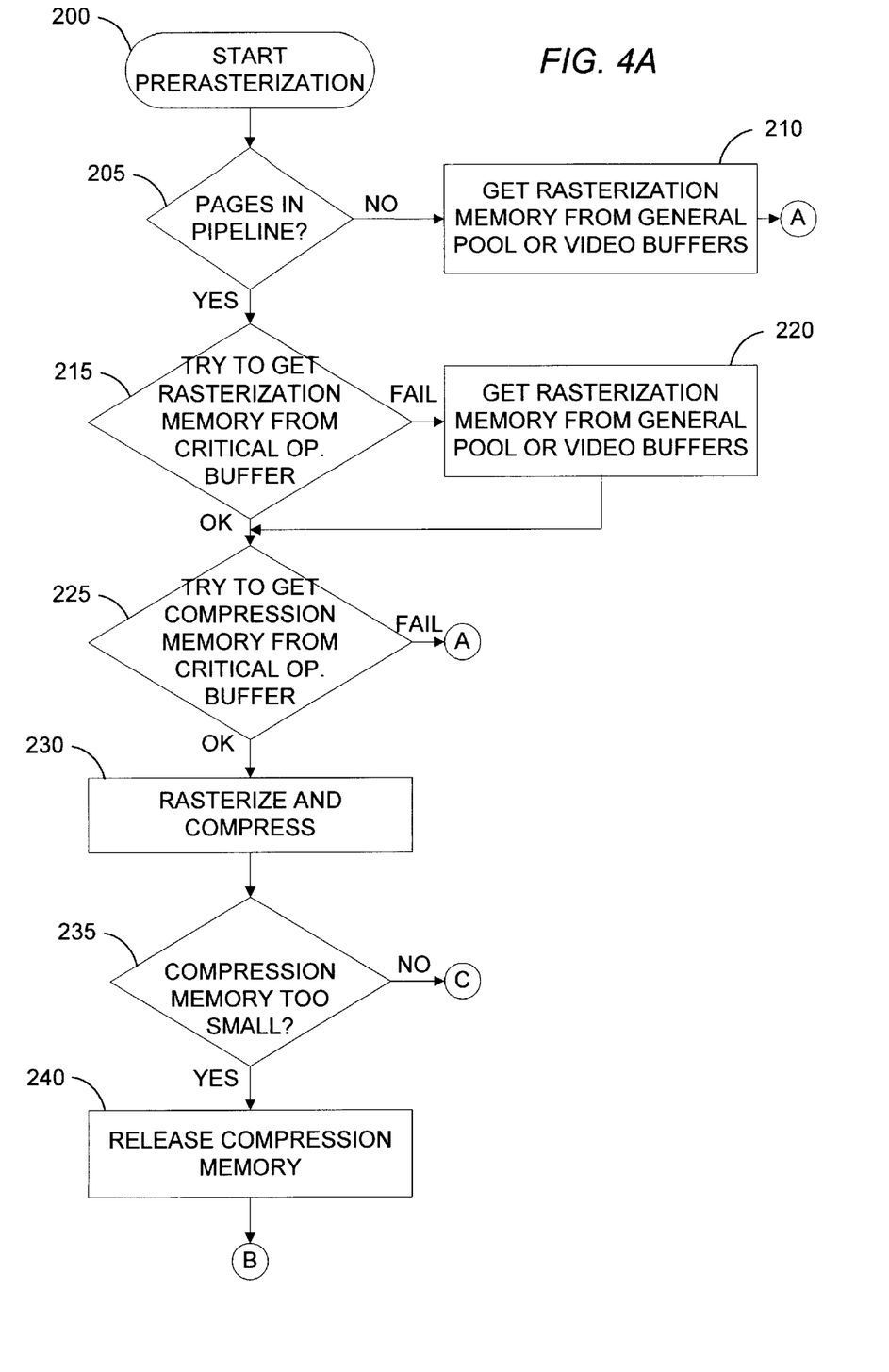
FIGS. 4A–B are flow charts depicting a preferred method of the present invention for using the critical operations buffer to reduce printer pausing.
Figure 4B:
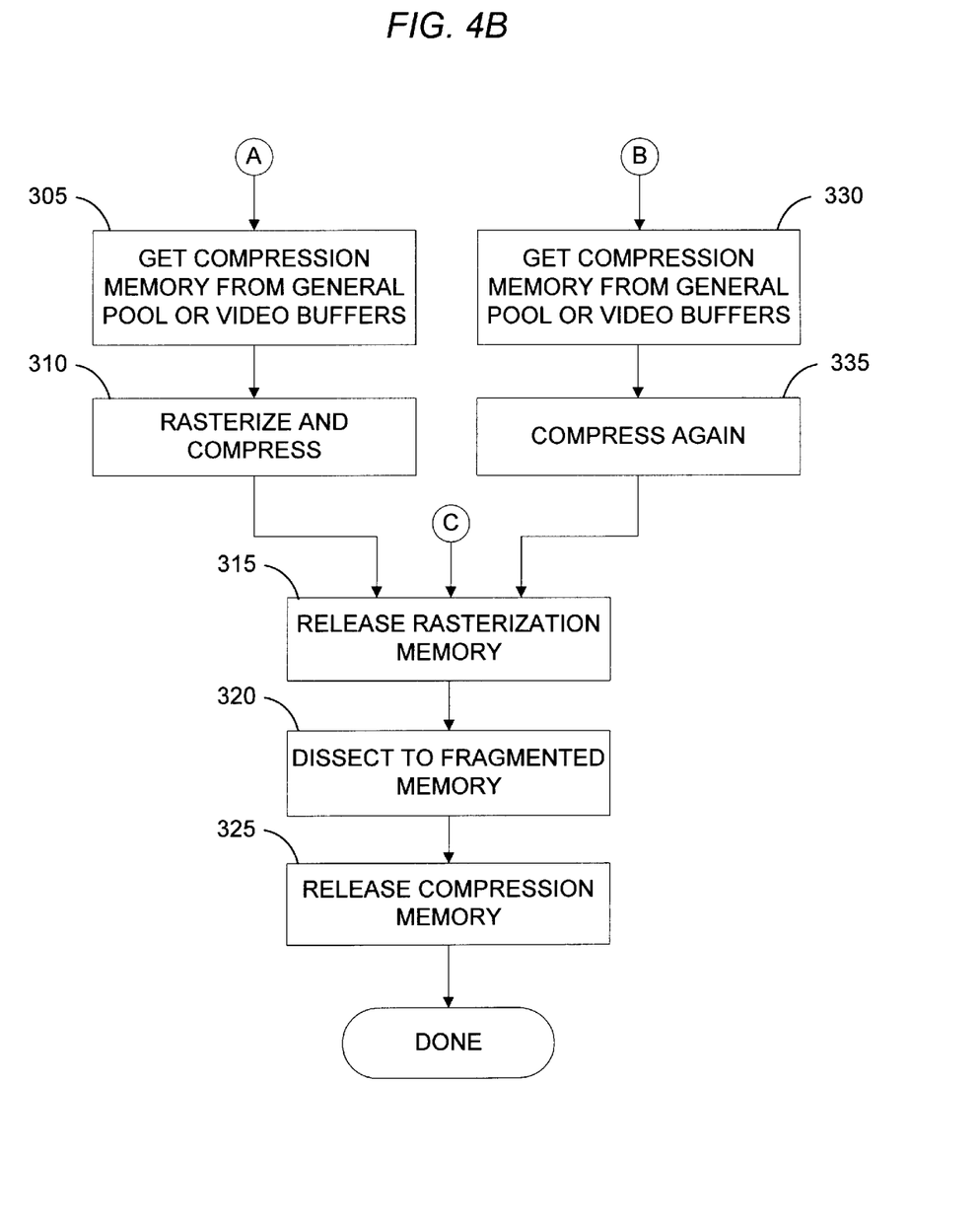

FIGS. 4A–B depict a flow chart of a preferred method of the present invention for using the critical operations buffer 60 to reduce printer pausing during a critical operation of prerasterization. Prerasterization may occur, for example, either upon encountering a complex page strip or upon detecting an insufficient memory status for processing the strip. In reference to FIG. 4A, upon starting the prerasterization process 200, it is first determined if any pages exist in the pipeline 205. If no pages exist in the pipeline, then it will be easy to allocate rasterization memory 210 from the general memory pool 40, or even from the video buffers 45–55 if desired. Subsequently, 305 (FIG. 4B), compression memory is also obtained from the general pool or video buffers, and then the page strip is rasterized and compressed 310 within the general pool or video buffers. Afterwards, the rasterization memory is released 315, the strip is dissected 320 into holes in memory 40, and then the compression memory is released 325. Subsequently, the dissected and distributed strip is transferred to a free video buffer 45–55 when the strip is required for imaging by print engine 30.

If pages exist in the pipeline 205 (FIG. 4A), then it is highly probable that the general pool of memory 40 is fragmented. Accordingly, 215, we try to get rasterization memory from critical operations buffer 60. If for some reason sufficient memory can not be allocated from critical operations buffer 60, then the rasterization memory is allocated 220 from the general pool 40 or the video buffers 45–55. In this case, preferably, the memory is allocated from the general pool. Otherwise, the pipeline would need to be flushed to allocate from the video buffers. It should be noted here that although not shown on the flow charts, if a memory allocation from the general pool or video buffers fails, then a general insufficient-memory failure occurs and is handled as known in the art.

If the rasterization memory is obtained from the critical operations buffer 215, or if memory was obtained from the general pool or video buffers, then compression memory is attempted to be obtained 225 from the critical operation buffer 60. If this fails, then the compression memory must be obtained from the general pool 305 (FIG. 4B), whereupon rasterization and compression occur 310, rasterization memory is released 315, the page strip is dissected to fragmented memory 320, and then the compression memory is released 325. However, 225, if the compression memory is obtained from critical operations buffer 60, then the strip is rasterized and compression is attempted 230 in the critical operations buffer. If the compression memory is too small 235, then it is released 240 and subsequently obtained 330 (FIG. 4B) from the general pool, compressed again 335, and then the rasterization memory is released 315, the strip is dissected to fragmented memory 320, and then the compression memory is released 325. On the other hand, if the compression memory is not too small 235 as allocated 225 from the critical operations buffer 60, then the process continues (FIG. 4B) by releasing the rasterization memory 315, dissecting the strip 320, and releasing the compression memory 325.

Importantly, each time the critical operations buffer 60 satisfies the memory allocation request, print job throughput consistency is enhanced (i.e., improved "pauseless" printing occurs).

Figure 5:
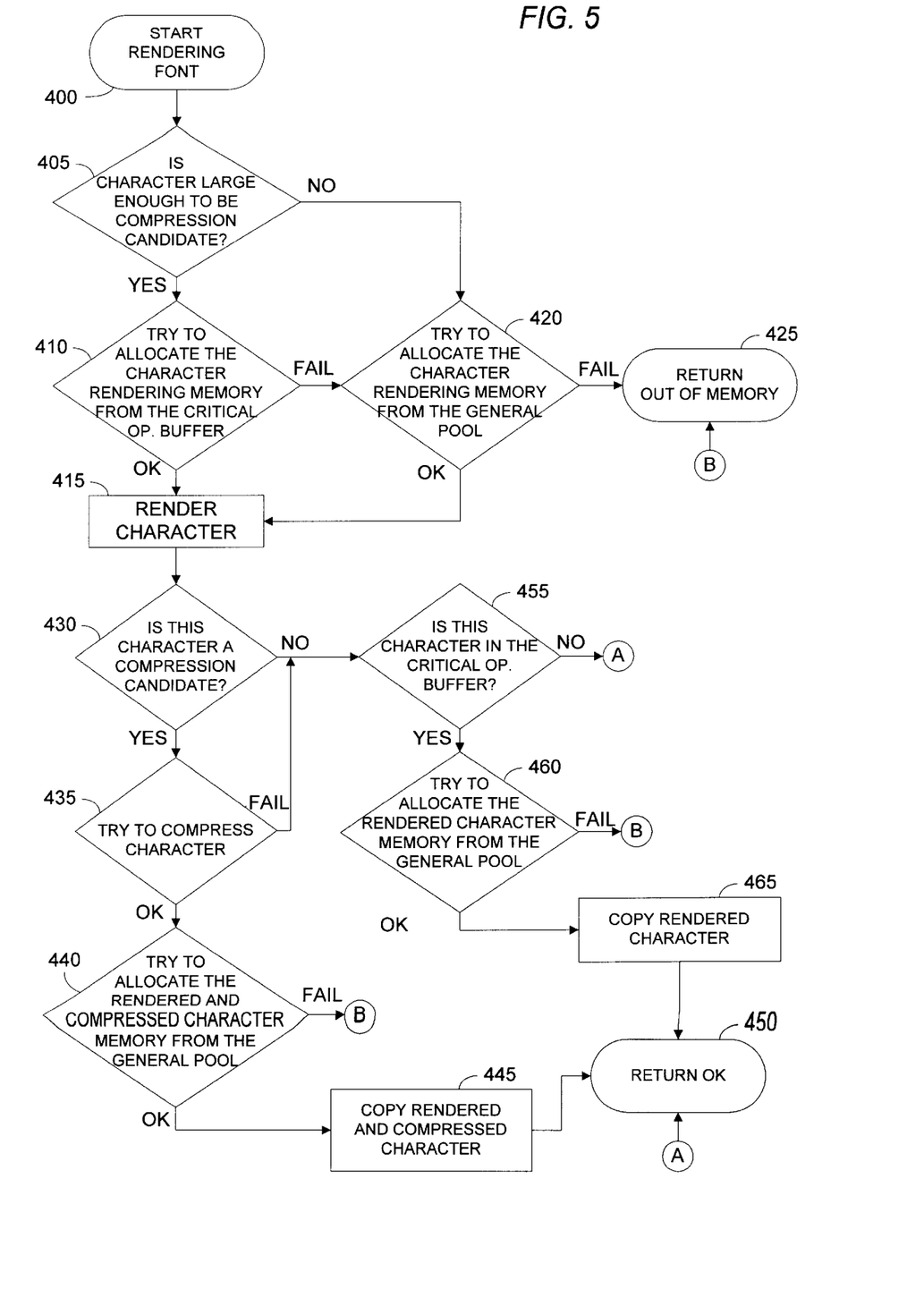
FIG. 5 is a flow chart depicting a preferred method of the present invention for using the critical operations buffer in connection with font rendering.

FIG. 5 depicts a flow chart of a preferred method of the present invention for using the critical operations buffer in connection with font rendering. Upon rendering a font 400, it is first determined 405 if the character is large enough to be a compression candidate. For example, a 1K byte threshold is set in a preferred embodiment. If the character exceeds the threshold, then 410 the character rendering memory is allocated from the critical operations buffer 60 for rendering of the character 415. However, if either the character does not exceed the compression threshold 405 or the character rendering memory is not allocable 410 from the critical operations buffer, then the character rendering memory is allocated 420 from the general pool 40 and then the character is rendered 415. But, obviously, if the rendering memory is not even allocable from the general pool, then an "out of memory" failure occurs 425.

After the character is rendered 415, then it is determined again whether the character is a compression candidate 430. This determination 430 may or may not be the same as or similar to the first determination 405. For example, in a preferred embodiment, in the second determination 430, factors in addition to size threshold are checked, such as is the character not going to be put in cache, and can the printer personality (i.e., printer control language) handle a compressed character?. If the character is again determined to be a compression candidate 430, then it is compressed 435

(preferably in some reserved area or, alternatively, in the general pool), memory is allocated from the general pool 440, the rendered and compressed character is copied to the general pool 445, and then the routine returns an "OK" status 450, indicative of the rendered and compressed character being ready in the general pool 40.

On the other hand, if the character is not a compression candidate 430 or if the character cannot be compressed 435, then if the character is in the critical operations buffer 455, the rendered character memory is allocated from the general pool 460 and the rendered character is subsequently copied into the general pool 465. However, if the character is not in the critical buffer 455, then an "OK" status is returned 450. Ultimately, if the character is in the critical operations buffer 455, but the rendered character memory cannot be allocated from the general pool 460, then an "out of memory" is returned 425.

In summary now, and in reference to all Figures, a micro memory manager in a printer facilitates large memory requests without waiting for returned-in memory to heal into larger free blocks. A critical operations memory block is pre-reserved and managed by the micro manager for enabling certain critical operations to occur, thereby enabling reduced "pausing" in the printer during a multi-page print job. This critical operations block is especially useful in the multi-resolution printer environment. For example, when a page printer operates at 1200 dpi on some pages and 600 dpi on others, it is not optimal to reuse all the 1200 dpi reserved video buffer memory for the 600 dpi. Thus, in the 600 dpi mode, the unneeded video buffer memory that was originally used for a 1200 dpi job, is used as part of the critical operations buffer. In essence, the size of the video buffers and critical operations block vary according to the resolution of the page being printed. High resolution pages require large video buffers, so less memory remains for the critical operations block. On the other hand, lower resolution pages require less space for video buffers, so more memory is available for the critical operations block. The net effect is that lower resolution pages generally have a large enough critical operations block to support prerasterization and compression of page strips and to support other critical operations, without using any significant permanent memory allocation beyond what would have been used for the higher resolution without the critical operations buffer feature.

In contrast, prior art printers tend to flush the page pipeline to recover memory when large contiguous blocks of memory are needed to compose the current page. Additionally, the prior art pre-reserved sufficient video buffer memory for the worst case (highest) resolution pages that might be printed. However, again, the present invention dynamically allocates a critical operations block to allow some of the most critical page composition activities to proceed without flushing the page pipeline. Moreover, some of the pre-reserved video buffer memory is re-used as the critical operations block for page composition when low resolution pages are printed.

Finally, it will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. An image forming device comprising:

(a) a print engine for processing a pipeline of print data;

(b) a general memory area connected to the print engine;

(c) first and second reserved memory areas connected to the print engine; and, (d) means for managing page description data in the general memory area, and for managing rendered page strip data in the first reserved memory area for immediate next output to the print engine, and for managing critical operation data in the second reserved memory area for enabling a generation of the rendered page strip data without flushing the first reserved memory area, such that constant throughput of the pipeline of print data is improved through reduced printing pauses.

2. The image forming device of claim 1 wherein the critical operation data includes data that requires a contiguous allocation of memory.

3. The image forming device of claim 1 wherein the critical operation data includes, selectively, pre-rasterized data, compressed data, rendered character bitmaps, scaled raster objects, rotated raster objects, vector path data, or data associated with defragmenting of the general memory area.

4. The image forming device of claim 1 wherein the critical operation data includes data that is stored temporarily in the second reserved memory area relative to data stored and processed in the general memory area prior to being stored in the first reserved memory area for output to the print engine.

5. The image forming device of claim 1 wherein the first and second reserved memory areas are part of the general memory area.

6. The image forming device of claim 1 further including means for dynamically modifying a configuration of the first and second reserved memory areas relative to each other.

7. The image forming device of claim 6 wherein the means for dynamically modifying a configuration of the first and second reserved memory areas includes means for modifying defined sizes of the first and second reserved memory areas.

8. The image forming device of claim 1 wherein the print engine is a multi-resolution device.

9. The image forming device of claim 8 further including means for dynamically modifying a configuration of the first and second reserved memory areas relative to a resolution configuration of the print engine.

10. The image forming device of claim 9 wherein the means for dynamically modifying a configuration of the first and second reserved memory areas includes means for increasing the first reserved memory area and for decreasing the second reserved memory area in response to a higher resolution configuration of the print engine, and for decreasing the first reserved memory area and for increasing the second reserved memory area in response to a lower resolution configuration of the print engine.

11. A method for reducing pausing of a print job in a printer, comprising:

(a) reserving first and second areas in a memory of the printer;

(b) managing rendered page strip data in the first memory area for output to a print engine of the printer; and, (c) managing critical operations data in the second memory area for enabling a generation of the rendered page strip data without flushing the first memory area, the critical operations data being stored in the second memory area temporarily relative to page description data stored in a general memory area, whereby constant throughput of data to the print engine is improved.

12. The method of claim 11 wherein the critical operations data includes data that requires a contiguous allocation of memory.

13. The method of claim 11 wherein the critical operations data includes, selectively, data to be pre-rasterized, data to be compressed, character bitmaps to be rendered, raster objects to be scaled, raster objects to be rotated, data for building vector paths, or data for defragmenting of the general memory area.

14. The method of claim 11 wherein the first and second reserved memory areas are part of a general memory area.

15. The method of claim 11 further including dynamically modifying a configuration of the first and second reserved memory areas relative to each other.

16. The method of claim 15 wherein the configuration of the first and second reserved memory areas includes defined sizes of the first and second reserved memory areas.

17. The method of claim 11 wherein the printer is a multi-resolution device, and further including dynamically modifying a configuration of the first and second reserved memory areas relative to a resolution configuration of the printer.

18. The method of claim 17 wherein the dynamically modifying a configuration of the first and second reserved memory areas includes increasing the first reserved memory area and decreasing the second reserved memory area in response to a higher resolution configuration of the printer, and decreasing the first reserved memory area and increasing the second reserved memory area in response to a lower resolution configuration of the printer.

19. A computer-readable medium having computer-executable instructions for performing steps in the method recited in claim 11.

20. A multi-resolution imaging device, comprising:
   (a) a general memory for storing page description data;
   (b) at least one reserved video buffer for storing rendered data for outputting on the imaging device;
   (c) at least one reserved critical operations buffer for managing critical operation data for enabling a generation of the rendered data; and,
   (d) means for dynamically sizing the video buffers and critical operations buffer relative to a current imaging resolution of the imaging device for improving constant throughput of data through the imaging device.

* * * * *